United States Patent

[11] 3,603,135

[72] Inventor: Yukiyoski Kawaguchi, Kyoto, Japan
[21] Appl. No.: 866,989
[22] Filed: Oct. 16, 1969
[45] Patented: Sept. 7, 1971
[73] Assignee: Kabushiki Kaisha Ichikin Kogyosha, Kusatsu-shi, Shiga-ken, Japan
[32] Priority: Nov. 14, 1968
[33] Japan
[31] 43/82845

[54] APPARATUS FOR CONTINUOUS MEASURING OF THE MOISTURE CONTENT IN A HIGH TEMPERATURE CHAMBER AT ATMOSPHERIC PRESSURE
9 Claims, 5 Drawing Figs.

[52] U.S. Cl. .................................................. 73/29, 73/77, 73/338
[51] Int. Cl. .................................................. G01n 25/62, G01n 25/56
[50] Field of Search ...................................... 73/29, 77, 338, 338.3, 338.6

[56] References Cited
UNITED STATES PATENTS

| | | | |
|---|---|---|---|
| 1,632,729 | 6/1927 | Foote et al. | 73/338.6 X |
| 3,191,313 | 6/1965 | Moorhouse et al. | 73/338 X |
| 3,459,034 | 8/1969 | Kawaguchi | 73/29 |
| 3,495,458 | 2/1970 | Christensen | 73/338.6 |

Primary Examiner—Richard C. Queisser
Assistant Examiner—Ellis J. Koch
Attorney—Waters, Roditi, Schwartz & Nissen ABSTRACT: The wet bulb thermometer of a psychrometer comprises a measuring portion mounted within a permeable sleeve which is high temperature resistant and which has a base portion extending outside the chamber containing the gaseous substance whose relative humidity is to be measured, the base portion being continuously traversed by flowing water so that the sleeve is always wetted.

PATENTED SEP 7 1971

3,603,135

INVENTOR
BY Yukiyoshi Kawaguchi

APPARATUS FOR CONTINUOUS MEASURING OF THE MOISTURE CONTENT IN A HIGH TEMPERATURE CHAMBER AT ATMOSPHERIC PRESSURE

BRIEF SUMMARY OF THE INVENTION

The invention relates to apparatus for measuring the moisture content of a gaseous substance in a chamber at high temperature and atmospheric pressure.

The measuring of the moisture content in a high temperature chamber at normal pressure, especially continuously, has proven to be very difficult, and it has been difficult to measure the wet bulb temperature in an atmosphere above 100° C. with a conventional psychrometer.

Accordingly, conventional measuring is effected in that a gaseous substance, whose moisture content is to be measured, within a high temperature chamber is led from the chamber into a sampling chamber kept near 100° C. and the wet bulb temperature at that time is known whereby the moisture content thereof can be measured. In this conventional arrangement, it is very difficult to maintain the temperature of the sampling chamber constant with change of temperature in the high temperature chamber and even if so adjusted, it takes considerable time before the temperature is stabilized, and there is caused delay in measurement and accordingly a continuous measurement is entirely impossible.

An object of the invention is to provide an apparatus in which the above defect, that is, the disadvantage of keeping the interior of the sampling chamber at a predetermined temperature can be overcome and thereby the moisture content of such a gaseous substance, within a treatment chamber for a web material or the like, that is about 250° C. at maximum, and which ranges from unsaturated to saturated conditions, can be continuously measured, and the apparatus is characterized in that a psychrometer with wet and dry bulb thermometers is provided in an atmosphere of the gaseous body to be measured, a measuring element for wet bulb temperature being detachably inserted in a sleeve made of a high-temperature-resistant capillary material the base portion of said sleeve being exposed to the passage of water at a predetermined amount and at a predetermined pressure so that the sleeve is wetted thereby for always being maintained in a predetermined wet condition.

DETAILED DESCRIPTION

Figure 1:
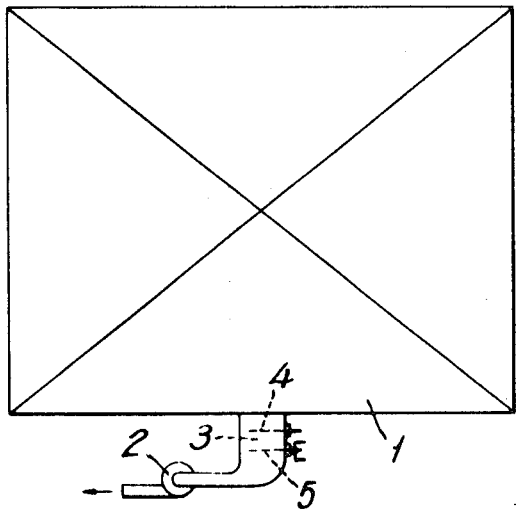
FIG. 1 is a diagrammatic illustration of one embodiment of this invention.

Referring to the drawing, numeral 1 denotes a high temperature chamber at atmospheric pressure, and a dry bulb thermometer 4 and a wet bulb thermometer 5 are provided at a measuring portion 3 within the atmosphere of a gaseous body to be measured. The measuring portion 3 may be either at any position within the chamber 1 (not illustrated) or proximate the chamber 1 (as illustrated in FIG. 1) when the gaseous body within the chamber 1 is removed as a streaming current by means of an exhaust fan 2.

Figure 2:
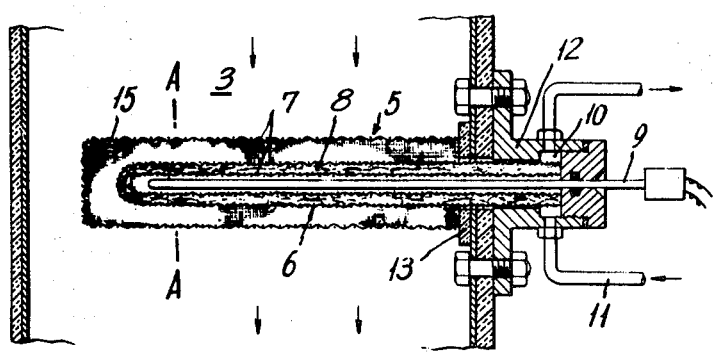
FIG. 2 is a sectional side view of a portion of FIG. 1.
Figure 3:
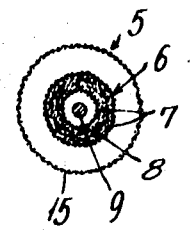
FIG. 3 is a sectional view taken along the line III—III in FIG. 2.

At the wet bulb thermometer 5, there is provided as shown in FIG. 2 a high-temperature-resistant air-permeable sleeve 6. This sleeve 6 is so constructed that a capillary material such as glass fiber, sponge platinum, asbestos, pumice, carbide or the like is filled within a space between inner and outer spaced wire nets 7 and the top end thereof is closed. A measuring element 9 of the wet bulb thermometer 5 is detachably inserted within sleeve 6 from the outside thereof. A base portion of the sleeve 6 projects outside the measuring portion 3 so as to be positioned in a passage 10 in which water passes from bottom to top. The necessity of the inner and outer wire nets 7 depends on the kind of the capillary material 8. The supply pressure and the amount, that is, the flow rate of water in the water passage 10 through a conduit 11 is properly predetermined so that the inner and outer surfaces of the sleeve 6 can be always kept in a predetermined wet condition to enable accurate readings of wet bulb temperature by the measuring element 9.

Figure 4:
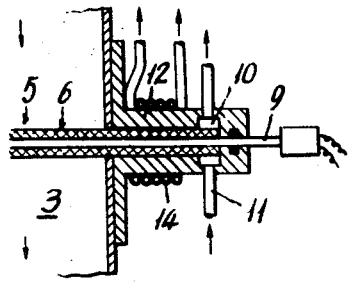
FIGS. 4 and 5 are sectional views of modified versions of the arrangement of FIG. 2.

The base portion of sleeve 6 is attached to the chamber wall through a mouthpiece 12. In this case, there is a danger that the mouthpiece 12 may be heated above 100° C. by the high temperature of the interior of the measuring portion 3 and the water contained in that portion of the sleeve 6 surrounded by the mouthpiece 12 will boil to produce bubbles which make measuring impossible. Accordingly, a heat-insulating plate 13 is provided at the portion of the mouthpiece 12 attached to the measuring portion 3 as shown in FIG. 2 to prevent heat transfer thereto. Alternatively, a pipe 14 for cooling water is mounted around the periphery of the mouthpiece 12 as shown in FIG. 4, so as to reduce the temperature thereof.

Figure 5:
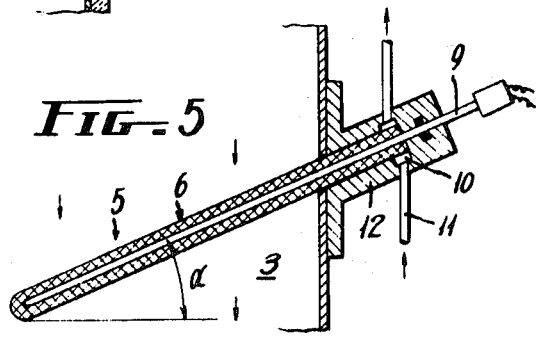

If the wet bulb temperature-measuring portion goes above 180° C., bubbles are liable to be produced owing to external variations so that the maintaining of the predetermined wet condition becomes difficult. These bubbles, however, can be moved to the base portion for being removed into the water passage 10 by inclining the sleeve 6 to direct its top end downward, as shown in FIG. 5. It has been found by experiment that this inclination angle $\alpha$ must be above 10°.

Referring to FIG. 2, numeral 15 denotes a filter of wire net or the like surrounding the outer surface of the sleeve 6, and this filter 15 serves to prevent any difficulty in measurement caused by foreign matter adhering to the outer surface of the sleeve 6.

According to this invention, the measuring element for the wet bulb temperature, provided within an atmosphere of the gaseous body to be measured, is covered by a capillary material made as a sleeve and said sleeve is always wetted in a predetermined wet condition, so that an accurate measuring of wet bulb temperature can be always obtained even with temperature change within the high temperature chamber. Hence the requirement for the sampling chamber, as in the conventional case, is not required and measuring can be effected continuously and simply.

What is claimed is:

1. In an apparatus for continuous measurement of the moisture content of a gaseous substance in a high temperature chamber at atmospheric pressure wherein a psychrometer with wet bulb and dry bulb thermometers is provided within an atmosphere of the gaseous substance to be measured, an improvement comprising a measuring element for the wet bulb temperature, a sleeve comprising spaced wire nets and high-temperature-resistant capillary material between said nets, said measuring element being detachably inserted in said sleeve, said sleeve including a base portion extending outside said chamber, and means for passing water over said base portion of said sleeve at a predetermined water pressure and at a predetermined flow rate for wetting the sleeve and maintaining the same always in a predetermined wet condition.

2. An improvement as claimed in claim 1 wherein said means for passing water over said base portion of said sleeve comprises a water passage at said base portion and a water conduit connected to said passage for passing water therethrough.

3. An improvement as claimed in claim 2 comprising a mouthpiece outside said chamber supporting said base portion of the sleeve, and means mounting said mouthpiece on said chamber.

4. An improvement as claimed in claim 3 comprising cooling means surrounding said mouthpiece to prevent overheating thereof by the gaseous substance in the chamber.

5. An improvement as claimed in claim 3 wherein said sleeve and measuring element are tilted downwardly such that the end of the sleeve remote from said base portion is lower than said base portion.

6. An improvement as claimed in claim 3 wherein said sleeve has an end remote from said base portion which is closed.

7. An improvement as claimed in claim 3 comprising a filter surrounding said sleeve.

8. An improvement as claimed in claim 3 wherein said chamber includes a channel in which the gaseous substance continuously flows, said mouthpiece and sleeve being mounted on said channel.

9. In an apparatus for continuous measurement of the moisture content of a gaseous substance in a high temperature chamber at atmospheric pressure wherein a psychrometer with wet bulb and dry bulb thermometers is provided within an atmosphere of the gaseous substance to be measured, an improvement comprising a measuring element for the wet bulb temperature, a sleeve constituted of high-temperature-resistant capillary material, said measuring element being detachably inserted in said sleeve, said sleeve including a base portion extending outside said chamber, means for passing water over said base portion of said sleeve at a predetermined water pressure and at a predetermined flow rate for wetting the sleeve and maintaining the same always in a predetermined wet condition, a mouthpiece outside said chamber supporting said base portion of the sleeve, means mounting said mouthpiece on said chamber, and heat insulation means within said chamber shielding the mouthpiece in the region of the base of the sleeve from heat effect of the gaseous substance in the chamber.